(12) United States Patent
Harman et al.

(10) Patent No.: US 7,307,843 B2
(45) Date of Patent: Dec. 11, 2007

(54) ELECTRONIC APPARATUS WITH A STORAGE DEVICE

(75) Inventors: Paul Harman, Glamorgan (GB); Simon Knight, Glamorgan (GB)

(73) Assignee: Thomson Licensing, Boulonge-Billancourt ( * ) Notice: Subject to any disclaimer, the term of this patent is extended or adjusted under 35 U.S.C. 154(b) by 213 days.

(21) Appl. No.: 10/995,901

(22) Filed: Nov. 24, 2004

(65) Prior Publication Data

US 2005/0117308 A1  Jun. 2, 2005

(30) Foreign Application Priority Data

Nov. 28, 2003  (EP) ................... 03257512

(51) Int. Cl.
*H05K 7/20* (2006.01)
*H02B 1/01* (2006.01)
(52) U.S. Cl. ............. 361/719; 361/687; 361/695; 361/825
(58) Field of Classification Search ............. 361/719
See application file for complete search history.

(56) References Cited

U.S. PATENT DOCUMENTS

| 5,191,230 | A | | 3/1993 | Heung ................ 307/141 |
| 5,511,055 | A | | 4/1996 | Otsuki et al. ......... 369/75.1 |
| 5,557,186 | A | * | 9/1996 | McMurtrey et al. ... 318/626 |
| 5,680,295 | A | * | 10/1997 | Le et al. .............. 361/695 |
| 5,740,013 | A | | 4/1998 | Roesner et al. ....... 361/697 |
| 5,806,952 | A | * | 9/1998 | Fujimori ............. 353/119 |
| 6,233,148 | B1 | | 5/2001 | Shen .................. 361/695 |

OTHER PUBLICATIONS

European Search Report.

* cited by examiner

*Primary Examiner*—Gregory D Thompson
(74) *Attorney, Agent, or Firm*—Joseph J. Laks; Harvey D. Fried; Patricia Verlangieri

(57) ABSTRACT

An electronic apparatus having a storage device received in a bracket, a printed circuit board on which the bracket is mounted, and a blower for cooling the storage device. The bracket forms a casing surrounding the blower and the casing extends through an opening of the printed circuit board. In this way, the blower is received in correspondence with the opening.

9 Claims, 3 Drawing Sheets

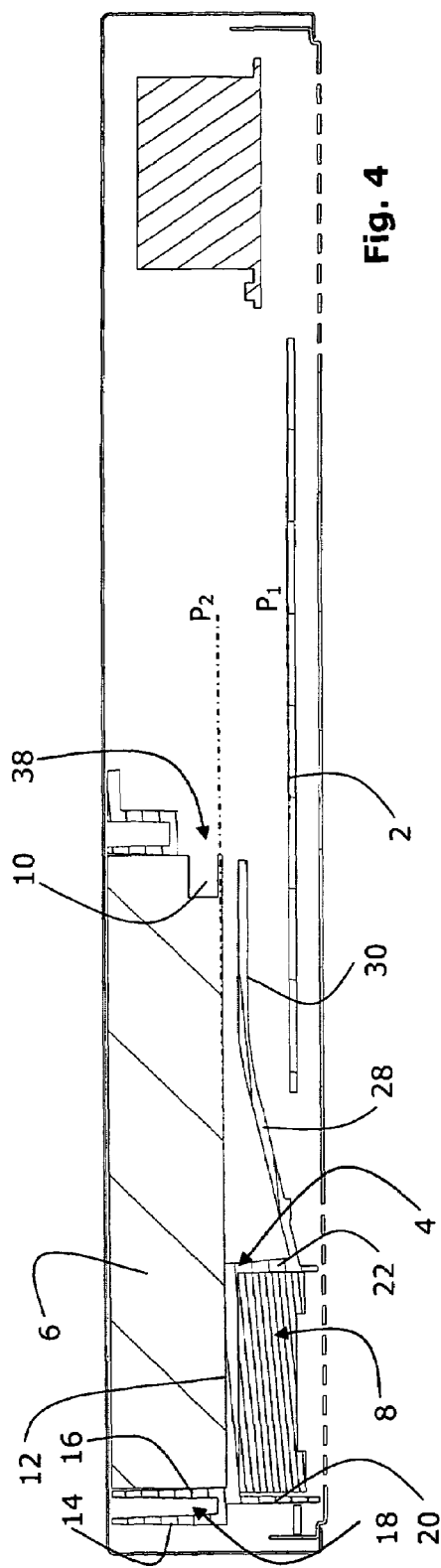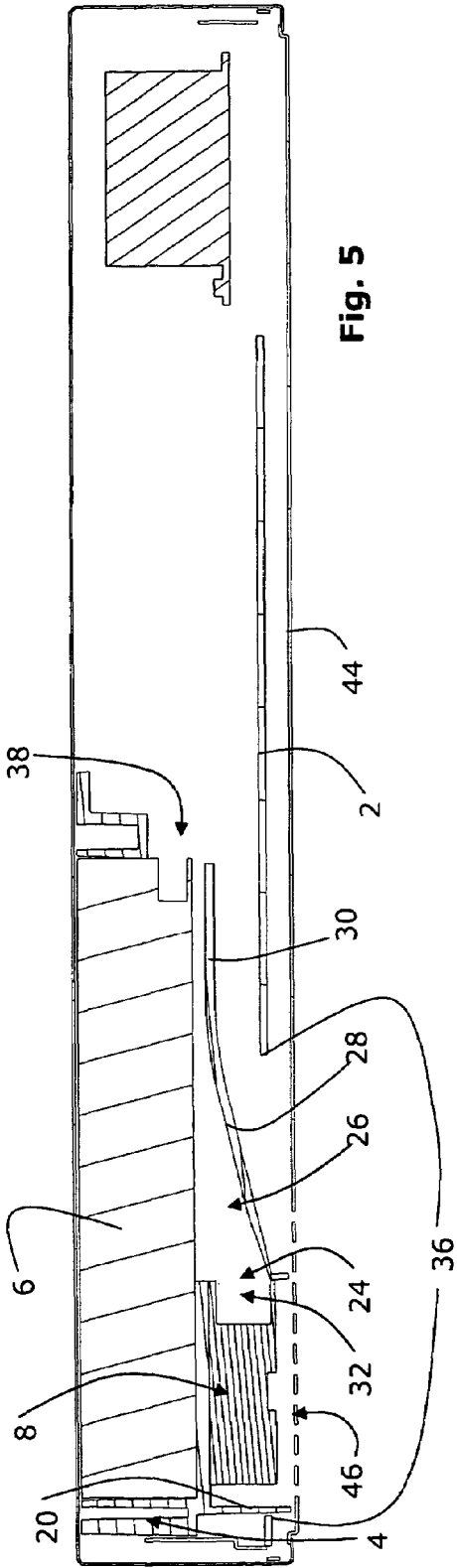

ELECTRONIC APPARATUS WITH A STORAGE DEVICE

FIELD OF THE INVENTION

The invention relates to an electronic apparatus with a storage device, such as a personal video recorder.

BACKGROUND OF THE INVENTION

In an electronic apparatus, a storage device is generally provided to store data of any kind. In the field of information technology, this data can define the way the apparatus operates (software) or information to be used by the various programs. In the field of consumer electronics, the data are generally a coded representation of a video signal and/or an audio signal.

The storage device can be either removable, such as an optical disc, or non-removable, such as a hard disc drive or a solid-state memory. In any case, in an effort to reduce the size of the electronic apparatus, designers must integrate electronic circuits linked to the storage device in a limited space, which generates too much heat to be evacuated by natural convection.

It has thus been proposed to provide the electronic apparatus with a blower to generate artificial convection, as described for instance in patent application US 2002/0051 338 and patents U.S. Pat. No. 6,480,380 and U.S. Pat. No. 6,538,886. U.S. Pat. No. 5,511,055 discloses an optical disk drive that is equipped with an air-cooling fan. The air-cooling fan is attached on a PCB, and the fan and the PCB are mounted to a bracket which takes up the optical disk drive. U.S. Pat. No. 5,191,230 discloses a fan module which can be mounted in a housing together with electronic circuit modules. The fan module comprises a PCB with an opening that is larger than the fan that is mounted. The fan can be moved to any position over the opening along two mounting rails.

Previous designs are however complicated. Notably, they cannot be easily integrated in an electronic apparatus having a printed circuit board implementing further functions, such as video processing, for instance in a personal video recorder.

SUMMARY OF THE INVENTION

The invention proposes an electronic apparatus comprising a storage device received in a bracket, a printed circuit board whereon the bracket is mounted, and a blower for cooling the storage device. The blower is received on the bracket in correspondence with an opening of the printed circuit board. The bracket has at least one base wall defining a plane, the storage device being located on a first side of the plane and the blower being received by the bracket on the second side of the plane.

In an advantageous embodiment, the bracket forms a casing surrounding the blower and the casing extends through the opening of the printed circuit board.

According to a preferred embodiment, the bracket has advantageously a passageway for air communication between the second side and the first side of the plane.

In order to greatly limit the generation of noise, the blower has an air outlet for directing air parallel to the plane and the passageway is realised by a duct wall inclined by less than 45° relatively to the plane.

To further improve the cooling of the storage device, the base wall has at least one recess on the first side and wherein the recess communicates with the passageway.

The invention also proposes that the bracket defines an air circulation circuit able to channel air from the blower to a border of the bracket so as to direct air on an electronic circuit of the printed circuit board. The cooling action provided by the blower is thus optimised and used for other parts of the circuits than the storage device.

An improvement for thermal isolation is provided by at least one partition wall that contacts the storage device and a cavity between the partition wall and an external wall of the device.

The storage device is for instance a hard disc drive. The invention is particularly interesting when the printed circuit board notably carries video processing circuits.

BRIEF DESCRIPTION OF THE DRAWINGS

Other features of the invention will appear in light of the following description made with reference to the appended drawings, where:

FIG. 4 represents a section along line C-C of FIG. 1;

FIG. 5 represents a section along line D-D of FIG. 1; and

A personal video recorder (PVR) embodying the teachings of the invention is represented on FIGS. 1 to 6.

DETAILED DESCRIPTION OF PREFERRED EMBODIMENTS

Figure 1:
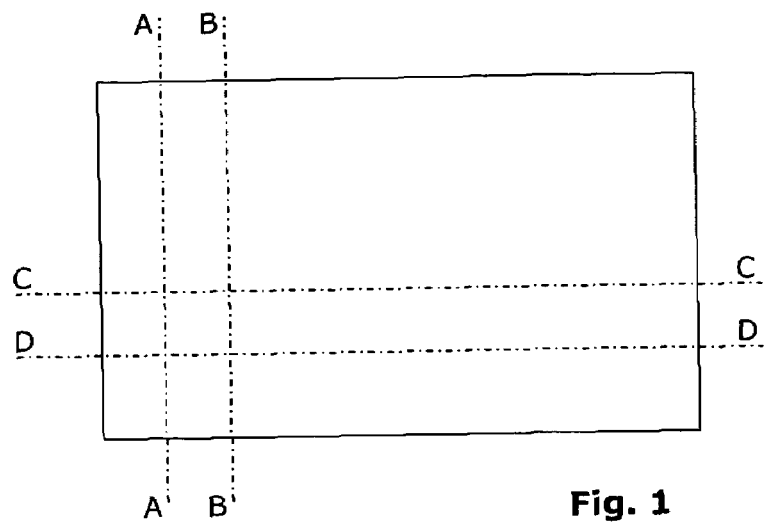
FIG. 1 is a schematic top view of a personal video recorder according to the invention.
Figure 2:
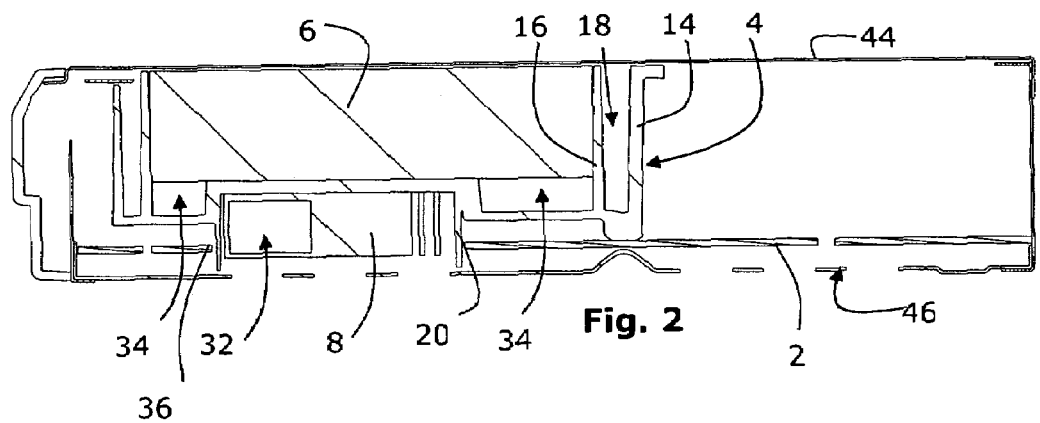
FIG. 2 represents a section along line A-A of FIG. 1.
Figure 3:
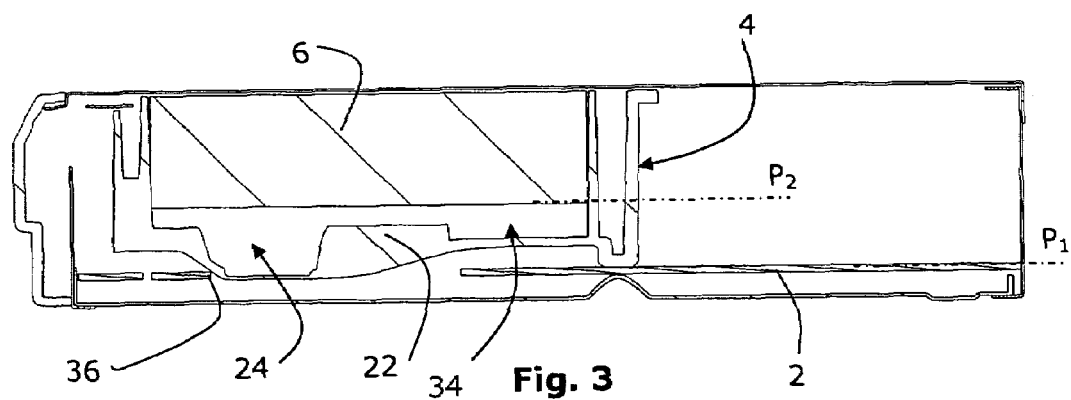
FIG. 3 represents a section along line B-B of FIG. 1.

FIG. 1 is a schematic top view of the PVR showing the location of the various sections represented in FIGS. 2 to 5, as specified above.

Referring to FIGS. 2 to 5, the PVR has a printed circuit board (PCB) 2 which defines a first plane $P_1$. A bracket 4 encasing a hard-disc drive (HDD) 6 is mounted on a top side of the PCB 2.

The PCB 2 carries electronic circuits (not shown). A first group of these electronic circuits are linked to the operation of the HDD 6, whereas a second group of these electronic circuits provides further functions, such as video processing.

In the instant example, the PVR also includes the functions of a digital decoder (or set-top box) and the second group of electronic circuits includes a tuner, a demodulator, a MPEG decoder and a video encoder.

The HDD 6 has the shape of a parallelepiped with the exception of a connector recess 10 at the bottom of its front face. The bracket 4 has the general shape of a box surrounding the HDD 6 except for one of its six faces.

The bracket 4 has a base wall 12 defining a second plane $P_2$ and contacting on its upper face the bottom face of the HDD 6. The bracket 4 has four external sidewalls 14 extending essentially perpendicular to the base wall 12 and defining the external dimensions of the bracket 4.

The bracket 4 also has four partition walls 16 contacting each side face of the HDD 6. Each partition wall 16 extends essential parallel to an external sidewall 14 at a small distance therefrom. The bracket 4 thus defines four cavities 18 between each partition wall 16 and each corresponding external sidewall 14. The cavities 18 limit the transfer of heat at these locations.

As visible on FIGS. 4 and 5, it can be noted that the front external sidewall and the front partition wall do not extend over the whole depth of the HDD 6, so as to realise an aperture 38 in correspondence with the connector recess 10. Cables (not shown) connecting circuits of the first group (or other circuits) to the HDD 6 extend trough the aperture 38.

A rectangular casing 20 extends from the bottom side of the base wall 12 so as to define a space for receiving a blower 8 incorporating a fan activated by a motor. The rectangular casing 20 consists of four walls which are essentially perpendicular to the base wall 12 and together define a rectangle in a plane parallel to the base wall 12.

The rectangular casing 20 extends in correspondence with a rectangular opening 36 in the PCB 2. In the present example, the rectangular casing 20 even extends through the rectangular opening 36 i.e. across the first plane $P_1$.

By providing the space receiving the blower 8 on the bottom face of the bracket 4 and in correspondence with the opening 36 of the PCB 2, the blower 8 can be very easily mounted or removed from the assembly without the need for any further operation, such as removal of the bracket 4 from the PCB 2 or removal of the HDD 6 from the bracket 4.

The front casing wall 22 has an opening 24 which partly defines a passageway 26 between the space defined by the casing 20 and receiving the blower 8 and the space defined by partition walls 16 and receiving the HDD 6.

Naturally, the opening 24 of the front casing wall 22 faces a corresponding air outlet 32 of the blower 8.

The bottom wall of the bracket 4 includes a first group of areas, which constitute the base wall 12 and are substantially planar, and a second group of areas 28, which are designed to channel air exhausted from the blower 8 and may thus be non-planar. The areas 28 of the second group notably further define the passageway 26 as an air duct by connecting the bottom region of the front casing wall 22 to the front region 30 of the bottom wall of the bracket 4, as particularly visible on FIG. 5.

The front region 30 of the bottom wall of the bracket 4 lies below the second plane P2 so that the passageway 26 extends all the way between the opening 24 of the front casing wall 22 up to the aperture 38 facing the connector recess 10. In this way, the passageway or air duct 26 allows air out of the blower 8 to follow the bottom face of the HDD 6 (closely in the area of the front region 30) and to be exhausted from the bracket 4 through the aperture 38.

It can be further noted that the bottom wall of the bracket defines an air duct 26 without sharp edges, but rather with a smoothly inclined surface to avoid the generation of noise by the air movement. For instance, the part of the bottom wall of the bracket 4 connecting the bottom of the casing wall 22 to the front region 30 has an inclination of less than 45° relative to a horizontal plane (such as the first plane $P_1$).

The bottom wall of the bracket 4 also defines recesses 34 in its upper surface carrying the HDD 6. The recesses 34 are obtained by realising the bottom wall of the bracket 4 lower than the second plane $P_2$ at these locations.

The recesses 34 are communicating with the air duct 26 (even when the HDD 6 is mounted) so that air exhausted from the blower 8 is partly directed to these recesses 34 in order to improve the cooling action to the bottom face of the HDD 6. By conveniently designing the recesses 34, the air stream can be directed to known hot spots of the HDD 6.

In this regard, it can be noted that the air circulation circuit defined by the air duct 26 and the recesses 34 can also be designed to direct air to a border of the bottom wall of the bracket 4 where it can be exhausted through a dedicated aperture to cool a neighbouring area of the PCB 2 where a hot spot has also been located. In this way, the artificial convection from the blower 8 is not only used to cool the HDD 6 carried by the bracket 4 but also neighbouring electrical circuits mounted on the PCB 2. This is notably possible because the air stream is precisely directed to important points by the air circulation circuit provided in the bracket 4, so that its efficiency is focused on these points.

Naturally, the various elements of the PVR described above are surrounded by a conventional enclosure 44, which has meshed regions 46 allowing air to cross the enclosure 44. One of the meshed regions 46 faces an air inlet of the blower 8.

Figure 6:
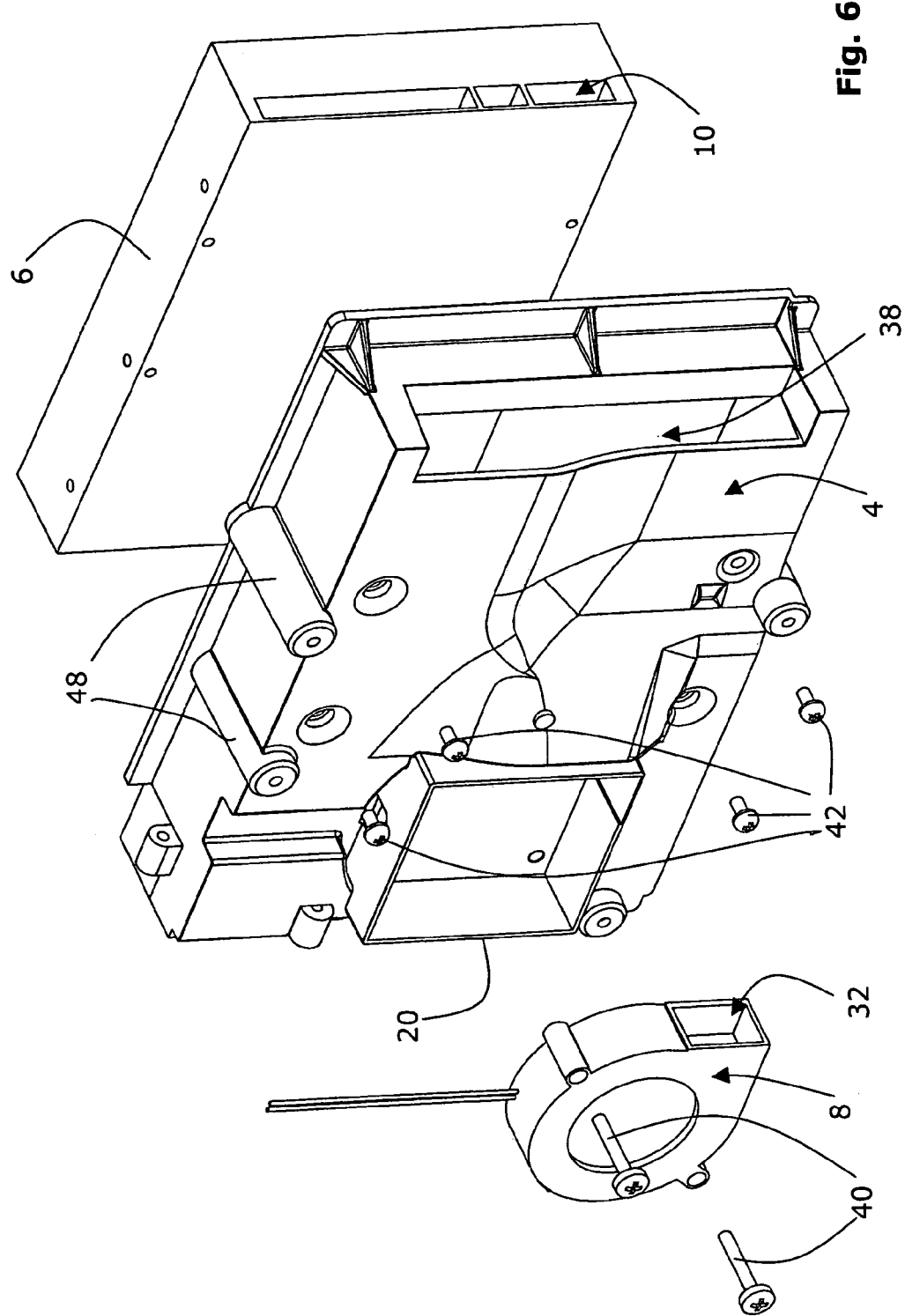
FIG. 6 is an exploded view of some parts of the personal video recorder of FIG. 1.

On FIG. 6, the relative mounting of the blower 8, bracket 4 and HDD 6 is clearly apparent: the blower 8 is mounted to the rectangular casing 20 of the bracket 4 from the bottom by a first set of screws 40; the HDD is mounted to the bracket 4 from the top by a second set of screws 42. Chimneys 48 are also provided so that the bracket 4 may be mounted on the PCB 2.

As clearly visible on FIG. 6, the construction proposed by the invention allows to insert from the same side and about the same plane the various screws 40, 42 for retaining the PCB 2, HDD 6 and blower 8 together, which greatly simplifies the realisation of the electronic apparatus on the assembly line.

What is claimed is:

1. An electronic apparatus comprising:
a storage device received in a bracket;
a printed circuit board on which the bracket is mounted;
a blower for cooling the storage device;
wherein the blower is received on the bracket in correspondence with a single opening of the printed circuit board, the bracket forming a casing surrounding the blower and extending in correspondence with the opening of the printed circuit board, the bracket having at least one base wall defining a plane, the storage device being located on a first side of the plane and the blower being received by the bracket on the second side of the plane.

2. The electronic apparatus of claim 1 wherein the casing surrounding the blower extends through the opening of the printed circuit board.

3. The electronic apparatus of claim 1 wherein the bracket has a passageway for air communication between the second side and the first side of the plane.

4. The electronic apparatus of claim 3 wherein the blower has an air outlet for directing air parallel to the plane and wherein the passageway is realised by a duct wall inclined by less than 45° relatively to the plane.

5. The electronic apparatus of claim 3 wherein the base wall has at least one recess on the first side and wherein the recess communicates with the passageway.

6. The electronic apparatus of claim 1 wherein the bracket defines an air circulation circuit able to channel air from the blower to a border of the bracket so as to direct air onto an electronic circuit of the printed circuit board.

7. The electronic apparatus of claim 1 wherein at least one partition wall contacts the storage device and wherein a cavity is provided between the partition wall and an external wall of the device.

8. The electronic apparatus of claim 1 wherein the storage device is a hard disc drive.

9. The electronic apparatus of claim 1 wherein the printed circuit board notably carries video processing circuits.

* * * * *